(12) United States Patent
Hamilton

(10) Patent No.: US 7,802,239 B2
(45) Date of Patent: Sep. 21, 2010

(54) SUPPORTING METHOD REFERENCES IN THE JAVA LANGUAGE

(75) Inventor: Graham Hamilton, Palo Alto, CA (US)

(73) Assignee: Oracle America, Inc., Redwood City, CA (US)

( * ) Notice: Subject to any disclaimer, the term of this patent is extended or adjusted under 35 U.S.C. 154(b) by 1351 days.

(21) Appl. No.: 11/271,424

(22) Filed: Nov. 9, 2005

(65) Prior Publication Data

US 2010/0169869 A1    Jul. 1, 2010

(51) Int. Cl.
  *G06F 9/45*    (2006.01)
  *G06F 9/44*    (2006.01)
(52) U.S. Cl. .................. 717/140; 717/108; 717/116; 717/165
(58) Field of Classification Search .......... 717/140
  See application file for complete search history.

(56) References Cited

U.S. PATENT DOCUMENTS

| | | | | |
|---|---|---|---|---|
| 4,875,186 | A * | 10/1989 | Blume, Jr. .................. | 703/24 |
| 6,167,565 | A * | 12/2000 | Kanamori .................. | 717/146 |
| 6,647,546 | B1 * | 11/2003 | Hinker et al. .............. | 717/137 |
| 7,207,032 | B1 * | 4/2007 | Verbitsky ................... | 717/106 |
| 7,251,594 | B2 * | 7/2007 | Krishnan .................... | 703/26 |
| 7,367,019 | B2 * | 4/2008 | Mak et al. .................. | 717/140 |
| 7,458,071 | B2 * | 11/2008 | Asao .......................... | 717/152 |
| 7,500,230 | B2 * | 3/2009 | Edwards et al. ............ | 717/141 |
| 2004/0111705 | A1 * | 6/2004 | Motoyama et al. ......... | 717/126 |
| 2005/0198624 | A1 * | 9/2005 | Chipman .................... | 717/146 |

OTHER PUBLICATIONS

IBM (NetRexx- Language Definition, May 26, 1998, URL:http://www-01.ibm.com/software/awdtools/netrexx/library/langdef.html, retrieved on Oct. 22, 2009).*
Becker (Working Draft, Standard for Programming Language C++, Oct. 19, 2005, URL:http://www.open-std.org/jtc1/sc22/wg21/docs/papers/2005/n 1905. pdf, retrieved on Oct. 22, 2009).*
Sun Microsystems, "Sun Microsystems—JavaBeans—Version 1.01-A," Graham Hamilton (editor), Aug. 8, 1997, 114 pages.
ECMA, "C# Language Specification," Draft #13, Sep. 27, 2001, located on the internet at <http//www.razorsoft.net/ecma/csharp.xml>, pp. 1-148.
European Patent Office, "European Search Report", Foreign application No. 06255752.5-1243, received Dec. 6, 2007, 6 pages.
Sun Microsystems, "JavaBeans™", Sun Microsystems, Version 1.01, XP-002191178, dated Jul. 24, 1997, 90 pages.

* cited by examiner

*Primary Examiner*—Thomas K Pham
(74) *Attorney, Agent, or Firm*—Osha • Liang LLP

(57) ABSTRACT

According to one embodiment of the invention, the JAVA compiler is modified so that when the JAVA compiler determines, while compiling source code, that an invocation of a first method, which expects to receive a reference to an object, passes, to the first method, a reference to a second method instead of a reference to an object, the JAVA compiler does not issue a compile-time error as the JAVA compiler normally would. Instead, the JAVA compiler generates compiled code (e.g., byte code) that the JAVA compiler would have generated if the source code had (a) defined a "bridge" class that implemented a method that invoked the second method and (b) contained, in the invocation of the first method, a reference to an object that was an instance of the "bridge" class in the place of the reference to the second method.

5 Claims, 3 Drawing Sheets

SUPPORTING METHOD REFERENCES IN THE JAVA LANGUAGE

BACKGROUND

The JAVA Language provides event-handling mechanisms for detecting and responding to user actions performed relative to a user interface. Using these event-handling mechanisms, a programmer can specify operations that a program should perform in response to the occurrence of an event of a specified type relative to a specified element of a user interface. When an event of the specified type occurs, the program automatically invokes a specified set of instructions. The programmer is spared from the burden of coding instructions that periodically poll for the occurrence of events of the specified type.

Different programming languages provide different syntactical techniques for specifying event-handling mechanisms. In JAVA, the event-handling mechanisms traditionally have been coded using "EventListener" interfaces. In JAVA, an "interface" is a type, just as a class is a type. Like a class, an interface defines methods. Unlike a class, an interface never implements methods; instead, classes that implement the interface implement the methods defined by the interface. A class can implement multiple interfaces.

Historically, in order to utilize the functionality of an EventListener interface, a programmer needed to define a new class that implemented a specific one of the EventListener interfaces. Each EventListener interface may define a different set of methods, where each method corresponds to a different event type. For example, one method might correspond to a "mouse click" event type and another method might correspond to a "mouse over" event type. If a programmer wanted his code to perform a particular set of operations in response to an occurrence of the "mouse click" event type, the programmer needed to "implement" the appropriate method of the appropriate interface by placing a specific implementation of the method in the new class. Within the code of the implementation of the method, the programmer placed the instructions that would be executed upon the occurrence of the event of the event type corresponding to the method.

For example, a JAVA program might comprise code such as:

```
public class Foo {
    private JButton fred=new JButton("fred");
    public class FredClicked implements ActionListener {
        public void actionPerformed(ActionEvent evt) {
            System.out.println("fred clicked");
        }
    }
    public void initialize( ) {
        fred.addActionListener(new FredClicked( ));
    }
}
```

In the above code, the programmer-defined class "FredClicked" implements an EventListener interface called "ActionListener." ActionListener defines the "actionPerformed" method, which the programmer has implemented within FredClicked. The implementation of the method causes the text "fred clicked" to be sent to the system output device. Other classes that implement ActionListener may implement the "actionPerformed" method in different ways.

Often, a user interface contains multiple user interface elements (e.g., buttons, text boxes, radio buttons, checkboxes, etc.) with which a user can interact. Multiple different events can occur relative to each of these user interface elements. Using the traditional approach described above, a new class (similar in structure to the FredClicked class of the above example) needed to be defined for each different event type-user element pair. For example, if a user interface consisted of five user interface elements, and if there were five types of events that could occur relative to each of those user interface elements, and if a programmer wanted his program to perform specific operations in response to each possible event occurrence relative to each user interface element, then the programmer needed to implement twenty-five separate classes.

Over time, programmers often find it tedious to re-enter, again and again, new class definitions that are highly similar and essentially necessary only because of the syntactical requirements of the JAVA Language. However, because EventListener interfaces have been a central part of JAVA for so long, a drastic departure from the current interface-based way of specifying event-handling mechanisms might not fit well into the general scheme of JAVA. A radical change in programming semantics, to adopt significantly different techniques that are used by other programming languages, might not be well received by those who have become accustomed to JAVA and its characteristics—especially the JAVA type system.

Therefore, a technique that allowed a programmer to specify event-handling mechanisms in JAVA using more concise, less verbose syntax would be both useful and desirable.

SUMMARY

In accordance with one embodiment of the present invention, when a code compiler locates, in the code being compiled, a reference to a programmatic method where a reference to an object is expected, the compiler does not issue an error. Instead, the compiler responsively generates compiled code that is functionally equivalent to compiled code that the compiler would have generated if the code being compiled had included (a) a "bridge" class that implemented a method that invoked the programmatic method and (b) a reference to an object that was an instance of the "bridge" class in the place of the reference to the programmatic method.

As a result of this technique, programmers are spared the burden of defining separate classes for the event-handling methods that those programmers place in their code. Instead of defining a new class that implements an event-handling method and then passing an object that is an instance of that new class as a parameter to another method (such as a method that registers an event listener), a programmer can instead simply define the event-handling method and pass a reference to the event-handling method as a parameter to the method to which the object reference would have been passed. Thus, the programmer can omit, entirely, the definition of the new class that implements the event-handling method.

DETAILED DESCRIPTION OF EMBODIMENT(S)

Overview

Figure 1:
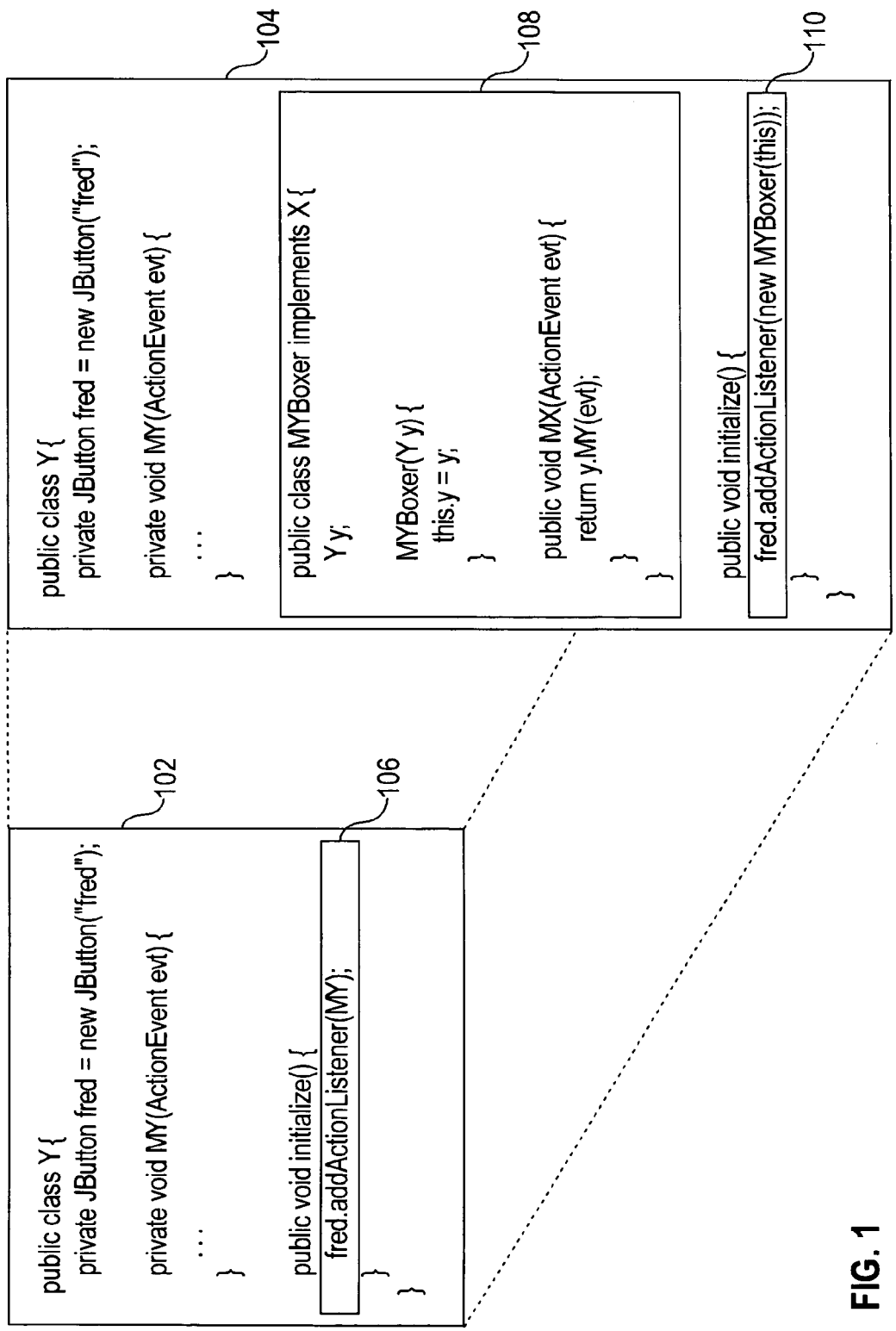
FIG. 1 is a diagram that illustrates an example of original source code and the corresponding hypothetical alternative code based on which a compiler would generate byte code in accordance with an embodiment of the invention.

According to one embodiment of the invention, the JAVA compiler is modified so that when the JAVA compiler determines, while compiling source code, that an invocation of a first method, which expects to receive a reference to an object, passes, to the first method, a reference to a second method instead of a reference to an object, the JAVA compiler does not issue a compile-time error as the JAVA compiler normally would. Instead, the JAVA compiler generates compiled code (e.g., byte code) that the JAVA compiler would have generated if the source code had (a) defined a "bridge" class that implemented a method that invoked the second method and (b) contained, in the invocation of the first method, a reference to an object that was an instance of the "bridge" class in the place of the reference to the second method.

For example, a compiler might be compiling the following source code in which an invocation of a first method, "addActionListener," passes, as a parameter to "addActionListener," a reference to a second method, "fredClicked," where "addActionListener" expected (based on the definition of "addActionListener") to receive a reference to an object instead:

```
public class Foo {
    private JButton fred=new JButton("fred");
    public void fredClicked(ActionEvent evt) {
        System.out.println("fred clicked");
    }
    public void initialize( ) {
        fred.addActionListener(fredClicked);
    }
}
```

At previous times, the above code would have caused the compiler to issue a compile-time error because the invocation of the "addActionListener" method passes a reference to an apparent object about whose existence the compiler is unaware: "fredClicked." The above code does not contain an instantiation of an object named "fredClicked." At previous times, when the compiler encountered such an invocation, the compiler would have tried to determine if the source code elsewhere instantiated an object named "fredClicked." Upon determining that the source code did not, the compiler would have issued an error.

However, according to an embodiment of the invention, in response to encountering such an invocation, the compiler instead generates byte code that the compiler otherwise would have generated if the source code had (a) additionally defined a class "fredClickedBoxer" that implemented a method that invoked method "fredClicked" and (b) contained, in the invocation of method "addActionListener," a reference to an object that was an instance of class "fredClickedBoxer" in the place of the reference to the method "fredClicked."

For example, in response to encountering the invocation shown in the source code above, the compiler might automatically generate byte code that would otherwise have been generated if the outer class "Foo" in the above source code additionally had contained the following code:

```
public class fredClickedBoxer implements ActionListener
{
    Foo y;
    fredClickedBoxer(Foo y) {
        this.y=y;
    }
    public void actionPerformed(ActionEvent evt) {
        return y.fredClicked(evt);
    }
```

Additionally, in response to encountering the invocation, instead of generating byte code that the compiler otherwise would have generated based on the invocation "fred.addActionListener(fredClicked)," the compiler might automatically generate byte code that is based on the invocation "fred.addActionListener(new FredClickedBoxer(this))."

The compiler does not actually need to generate the above alternative source code before generating the byte code; the compiler can treat the original source code as though it were equivalent to the alternative source code and generate byte code based on how the alternative source code would have been written. The compiler generates byte code that is functionally equivalent to the alternative source code. As can be seen above, the alternative source code contains both a definition of a new "bridge" class "fredClickedBoxer" that implements method "actionPerformed" that invokes method "fredClicked," and also contains a revised invocation that passes, to method "addActionListener," a reference to an object that is an instance of class "fredClickedBoxer" instead of a reference to method "fredClicked."

"The JavaBeans API Specification," version 1.01 by Graham Hamilton (Aug. 8, 1997) is incorporated by reference as though fully and originally disclosed herein. "The JavaBeans API Specification" defines the standard JAVA event-handling model.

Example Implementation

According to one embodiment of the invention, during compile-time, whenever a compiler locates, in source code, a method invocation in which a reference to a method "MY" of a class "Y" is being passed as a parameter to the method invoked, where the method invoked expects to receive a reference to an object, and where that object is an instance of a class that implements an interface "X" that defines a single method "MX," the compiler makes the following determination:

In the circumstances described above, the compiler determines whether the "signature" of method "MY" is compatible with the "signature" of method "MX." In one embodiment of the invention, the signature of method "MY" is considered to be compatible with the signature of method "MX" if the signature of method "MY" is a "subsignature" of the signature of method "MX." Signatures and subsignatures are briefly described in the section titled "Signatures" below.

If the compiler determines that the signature of method "MY" is compatible with the signature of method "MX," then, in one embodiment of the invention, the compiler generates byte code that would have been generated if, in the source code, the "outer class" containing the method invocation had contained an "inner class" having the following form (where "Z" is the return type of method "MX"; e.g., "void"):

```
public Boxer implements X {
    Y y;
    Boxer(Y y) {
        this.y=y;
    }
    public Z MX(A a, B b) {
        return y.MY(a, b);
    }
}
```

In essence, the compiler automatically creates a new "bridge" class by generating the byte code corresponding to the above code. A separate "bridge" class may be created for each corresponding method reference that is passed as a parameter in a method invocation. The class name "Boxer" is used only for purposes of example; embodiments of the invention can use different class names for each different method reference that is passed as a parameter in a method invocation. For example, if a first method invocation passes a reference to a method named "fredClicked," then the corresponding "bridge" class may be named "fredClickedBoxer." If a second method invocation passes a reference to a method named "burtClicked," then the corresponding "bridge" class may be named "burtClickedBoxer."

According to one embodiment of the invention, in addition to generating the byte code as described above, the compiler also maps each method invocation having the form "addActionListener(MY)" in the source code to an alternative method invocation having the form "addActionListener(new Boxer(this))." For example, the compiler may accomplish this mapping by generating byte code that corresponds to the alternative method invocation whenever the compiler would otherwise have generated byte code that corresponds to the original method invocation. As a result of this mapping, a method invocation that passed a reference to method "MY" is effectively made to pass a reference to an object that is an instance of the automatically generated "bridge" class instead.

FIG. 1 is a diagram that illustrates an example of original source code and the corresponding hypothetical alternative code based on which a compiler would generate byte code in accordance with an embodiment of the invention described above. Box 102 contains the code that the programmer originally enters in the source code to be compiled. As can be seen, box 106 within box 102 contains an invocation of a method "addActionListener" in which a reference to a method "MY" is passed where a reference to an object is expected.

According to one embodiment of the invention, when the compiler generates byte code based on the source code in box 102, the byte code is functionally equivalent to byte code that would be generated if the compiler had generated byte code based on the hypothetical alternative code in box 104 instead. The code in box 104 is similar to the code in box 102, with a few alterations. Into class "Y," the "bridge" class "MYBoxer" has been inserted. Class "MYBoxer" implements interface "X" because the compiler has determined that method "addActionListener" expects an object that is an instance of a class that implements interface "X." Class "MYBoxer" comprises a constructor method (method "MYBoxer") and a method "MX," which is defined by interface "X."

Method "MX" has the same return type and arguments as method "MY" of class "Y." Method "MX" is implemented such that when method "MX" is invoked, method "MX" invokes method "MY" with the same parameters that were passed to method "MX."

Additionally, instead of the method invocation 106 in box 102, box 104 contains a revised method invocation 110, which invokes method "addActionListener," passing an object that is an instance of the new "MYBoxer" class shown in box 108.

When executed, the byte code resulting from the compilation of the code in box 102 has the same effect that the byte code that would result from the compilation of the code in box 104 would have. However, the source code in box 102 is much more concise and terse than the code in box 104. Using the syntax shown in box 102 saves a programmer time and effort.

Figure 2:
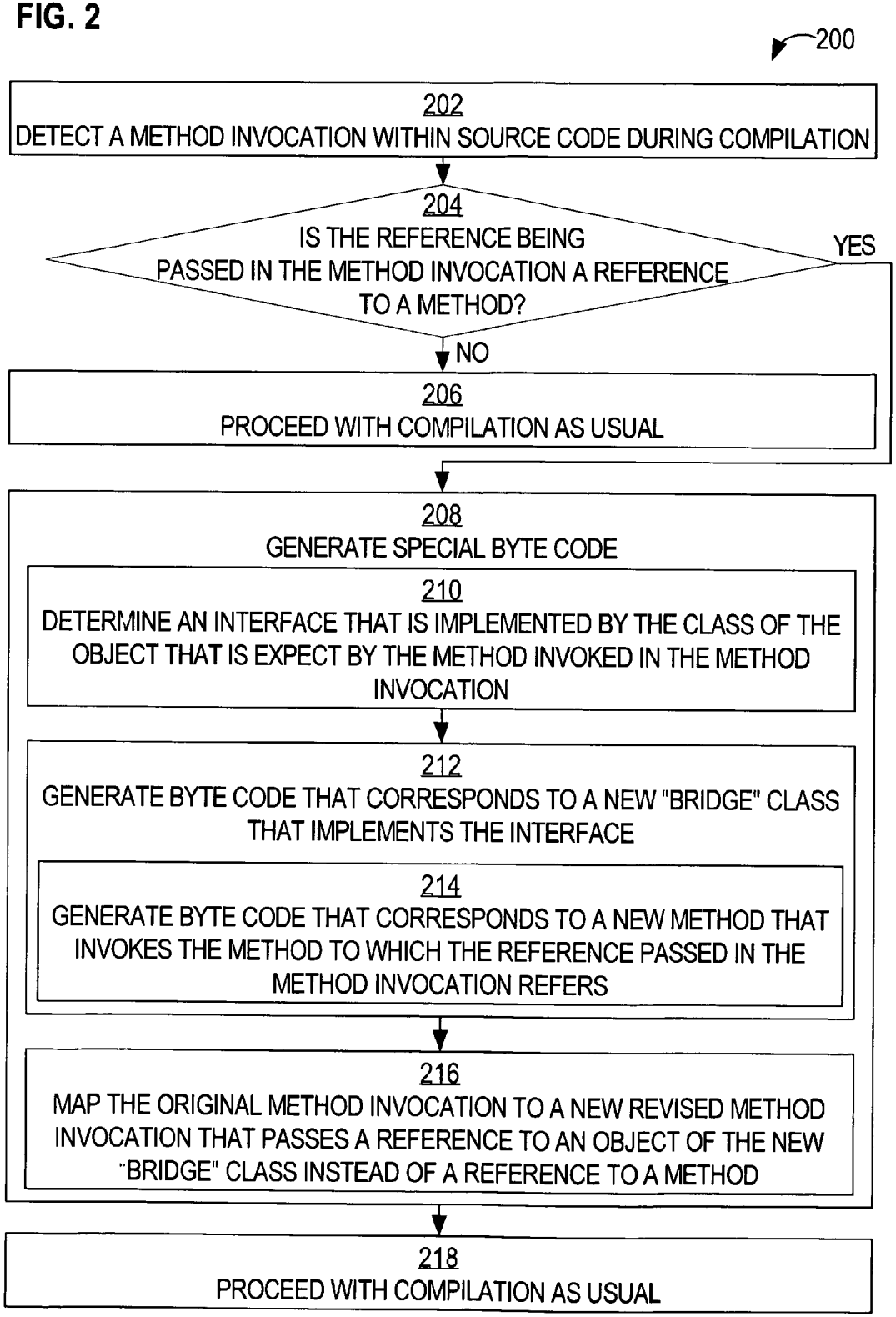
FIG. 2 is a flow diagram that illustrates an example of a technique for generating byte code based on source code that contains an invocation of a method to which a reference to another method is passed as a parameter.

FIG. 2 is a flow diagram that illustrates an example of a technique 200 for generating byte code based on source code that contains an invocation of a method to which a reference to another method is passed as a parameter. For example, technique 200 may be performed by a JAVA compiler that executes on a computer such as the device illustrated in FIG. 3 below. Technique 200 may be performed multiple times during the compilation of source code.

In block 202, a method invocation is detected within source code that is being compiled. For example, the compiler may detect the method invocation "fred.addActionListener(MY)" as shown in box 106 of FIG. 1.

In block 204, in response to detecting the method invocation, it is determined whether the reference being passed as a parameter to the method invoked is a reference to an object or a reference to a particular method. For example, the compiler may determine whether "MY" is a reference to an object or a method. If the reference is an object reference, then control passes to block 206. Otherwise, control passes to block 208.

In block 206, compilation proceeds as is usual when a method invocation involves an object reference being passed as a parameter to the method invoked. The compiler may generate byte code that is commensurate with the method invocation.

Alternatively, in block 208, special byte code is generated. The special byte code is the same as byte code that would have been generated if the class containing the method invocation additionally contained a "bridge" class and a revised method invocation as described above. In one embodiment of the invention, generating the special byte code involves modifying byte code that the compiler already generated. In one embodiment of the invention, generating the special byte code involves the operations described in blocks 210-216 below.

In block 210, an interface implemented by the class of the object that is expected by the method invoked in the method invocation (detected in block 202 above) is determined. For example, the compiler may determine that method "addActionListener" expected to receive an object that was an instance of a class that implements interface "X."

In block 212, byte code that corresponds to a new "bridge" class is generated. The new "bridge" class implements the interface that was determined in block 210 above. For example, the compiler may generate byte code that corresponds to the class "MYBoxer" shown in box 108 of FIG. 1. In one embodiment of the invention, generating the byte code that corresponds to the new "bridge" class involves the operations described in block 214 below.

In block 214, byte code that corresponds to a new method is generated. The new method is the single method "MX" that is defined by interface "X." The new method is implemented in such a way that, when the new method is invoked, the new method invokes the method "MY" that corresponds to the method reference that is passed to the method being invoked ("addActionListener") in the method invocation, and with the same parameters (e.g., "evt of type ActionEvent") as those used to invoke the new method. For example, the compiler may generate byte code that corresponds to the method "MX" shown in box 108 of FIG. 1.

In block 216, the method invocation is mapped to a new revised method invocation. According to one embodiment of the invention, this mapping involves modifying the byte code that the compiler generated for the original method invocation ("fred.addActionListener(MY)") so that the byte code reflects the operations of the revised method invocation instead. The revised method invocation passes, to the invoked method ("addActionListener") a reference to object that is an instance of the new "bridge" class ("MYBoxer") rather than the method reference (to method "MY") that was passed to the invoked method in the original method invocation. For example, the compiler may revise the byte code that corresponds to the method invocation of box 106 of FIG. 1 so that the byte code reflects the revised method invocation of box 110 of FIG. 1 instead.

In block 218, compilation proceeds as usual. The compiler may continue to generate byte code based on the remainder of the source code being compiled.

In one embodiment of the invention, before the special byte code is generated as described above, the compiler determines whether the signature of method "MY" is compatible with the signature of method "MX" as discussed above. In one embodiment of the invention, the compiler issues an error if the method signatures are incompatible.

Passing References to Methods of Other Objects

In the above discussion, the original method invocation passed a reference to a method of the "current" object. For example, in box 106 of FIG. 1, the original method invocation "fred.addActionListener(MY)" is assumed to pass a method of the "current" object, because the method reference does not expressly designate any object. Where the method reference is not qualified by an object reference, the method reference is assumed to refer to a method of the "current" object "this." Thus, the original method invocation shown in box 106 could have been written equivalently as "fred.addActionListener(this.MY)."

However, there may be times when it is desirable to write source code that passes, as a parameter in an original method invocation, a reference to a method of some object other than the "current" object. For example, there might be two objects that are both instances of class "Y." One object might be named "jack" and the other object might be named "burt." If the programmer wanted each object to pass, in the "addActionListener" method invocation, a reference to the method "MY" of object "jack," rather than a reference to the method "MY" of the current object itself, then the programmer might alternatively code the original method invocation shown in box 106 as follows:

fred.addActionListener(jack.MY);

According to one embodiment of the invention, the revised method invocation (e.g., the revised method invocation shown in box 110 of FIG. 1) expressly indicates the object reference that qualified the method reference that was passed as a parameter in the original method invocation, if any. For example, if the method reference "MY" were qualified with the object reference "jack" as discussed in the example above, then the corresponding revised method invocation would be:

fred.addActionListener(new MYBoxer(jack));

Thus, according to one embodiment of the invention, whenever the original method invocation passes a method reference that is not expressly qualified by a particular object reference, the corresponding revised method invocation causes the "bridge" class' constructor method to be invoked using the implicit object qualifier "this," but whenever the original method invocation passes a method reference that is qualified by a particular object reference, the corresponding revised method invocation causes the "bridge" class' constructor method to be invoked using the particular object reference instead (e.g., "jack").

Signatures

According to one embodiment of the invention, a particular method's signature includes the particular method's name, the argument types of the particular method's formal parameters, and the bounds of the particular method's type parameters. According to one embodiment of the invention, two methods have the same signature if they have the same name and the same argument types. According to one embodiment of the invention, two methods have the same argument types if all of the following are true:

The methods have the same number of formal parameters (which may be zero).
The methods have the same number of type parameters (which may be zero).
Letting $<A_1, \ldots A_n>$ be the formal type parameters of one method and letting $<B_1, \ldots B_n>$ be the formal type parameters of the other method, after renaming $B_i$ to $A_i$ for all values of i from 1 to n, the bounds of the corresponding type variables and the argument types of the methods are the same.

The signature of method "MY" is a "subsignature" of the signature of method "MX" if either "MX" has the same signature as "MY," or the signature of "MY" is the same as the erasure of the signature of "MX."

Hardware Overview

Figure 3:
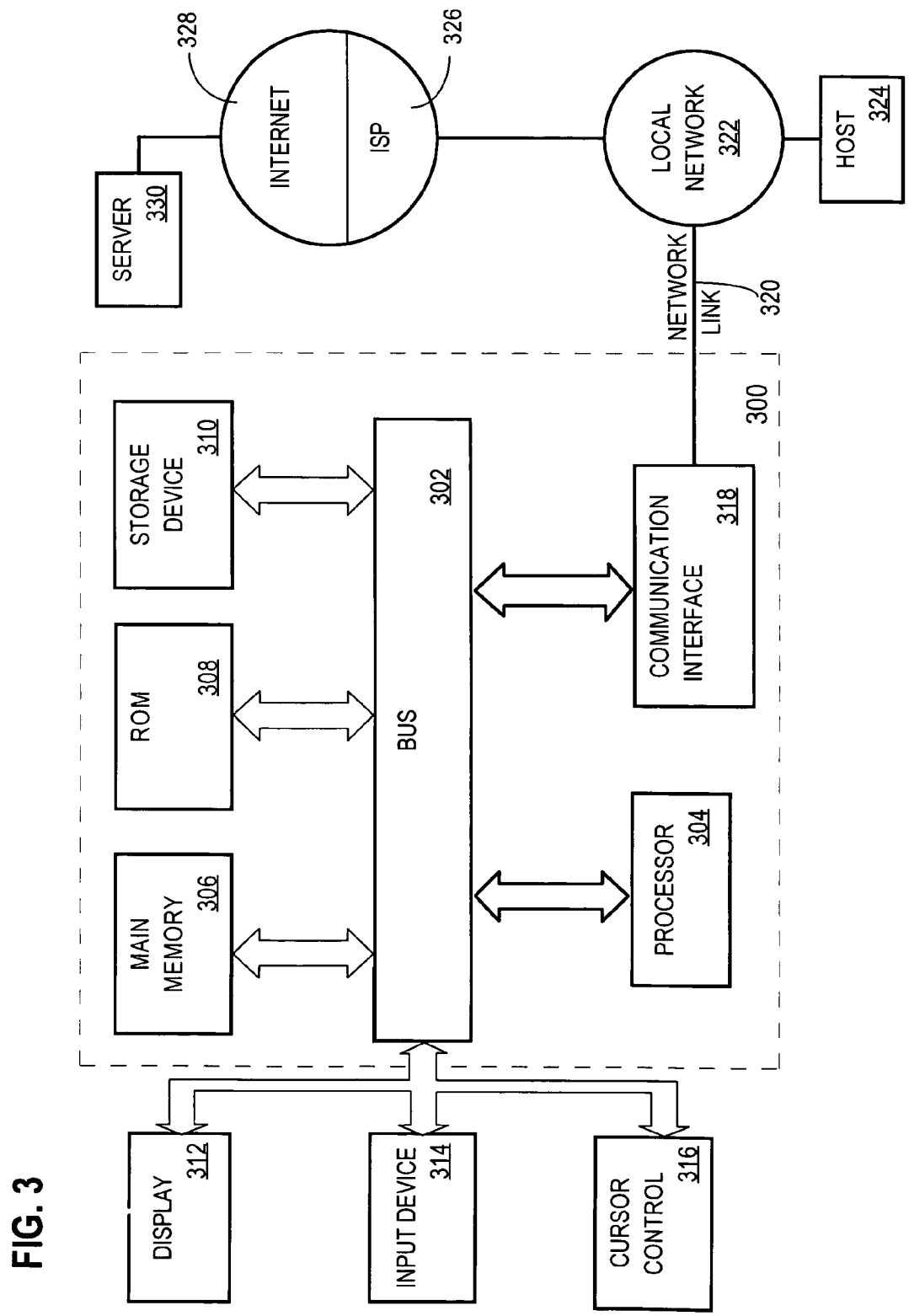
FIG. 3 is a hardware block diagram of an example computer entity, upon which certain embodiments of the invention may be implemented.

FIG. 3 is a block diagram that illustrates a computer system 300 upon which an embodiment of the invention may be implemented. Computer system 300 includes a bus 302 for facilitating information exchange, and one or more processors 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions by processor 304. Computer system 300 may further include a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

In computer system 300, bus 302 may be any mechanism and/or medium that enables information, data, etc., to be exchanged between the various components. For example, bus 302 may be a set of conductors that carries electrical signals. Bus 302 may further be a network connection that connects one or more of the components. Overall, any mechanism and/or medium that enables information, data, etc., to be exchanged between the various components may be used as bus 302.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and tangible media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. According to one embodiment of the invention, the transmission media referred to above are tangible (i.e., "substantially real") media.

Common forms of machine-readable media include, for example, a floppy disk, a flexible disk, hard disk, magnetic tape, or any other magnetic medium, a CD-ROM, DVD, or any other optical storage medium, punchcards, papertape, any other physical medium with patterns of holes, a RAM, a PROM, and EPROM, a FLASH-EPROM, any other memory chip or cartridge, or any other tangible medium from which a computer can read.

Various forms of machine-readable media may be involved in carrying one or more sequences of one or more instructions to processor 304 for execution. For example, the instructions may be carried on a magnetic disk of a remote computer. Bus 302 may carry the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented.

Network link 320 typically provides data communication through one or more networks to other devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328.

Computer system 300 can send messages and receive data, including program code, through the network(s), network link 320 and communication interface 318. In the Internet example, a server 320 might transmit a requested code for an application program through Internet 328, ISP 326, local network 322 and communication interface 318.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A machine-readable medium carrying one or more sequences of instructions, which instructions, when executed by one or more processors, cause the one or more processors to carry out the steps of:
   locating, within source code, a first method invocation for a first programmatic method, wherein the first method invocation passes the first programmatic method a first argument as a first parameter;
   determining whether the first argument references a second programmatic method;
   based on a determination that the first argument references the second programmatic method:
     determining an expected type for the first parameter;
     determining a first object-oriented programming (OOP) class defining the expected type;
     determining an interface implemented by the first OOP class;
     generating a first compiled code for a second OOP class that implements the interface, wherein the first compiled code comprises a third programmatic method defined for the second OOP class, and wherein the third programmatic method invokes the second programmatic method; and
     modifying a second compiled code generated for the first method invocation such that the first argument for the first method invocation references an instance of the second OOP class.

2. The machine-readable medium of claim 1, wherein the source code does not comprise a definition for the second OOP class.

3. The machine-readable medium of claim 1, wherein the source code is written in JAVA programming language.

4. The machine-readable medium of claim 1, wherein the first programmatic method is a method defined for a user interface element OOP class to register an event listener for the user interface element, and wherein the second programmatic method is the event listener.

5. The machine-readable medium of claim 1, wherein the second programmatic method is an event-handling method that is automatically invoked in response to an occurrence of an event of a specified event type relative to a specified object.

* * * * *